United States Patent
Roturier et al.

(10) Patent No.: US 10,931,670 B1
(45) Date of Patent: Feb. 23, 2021

(54) UNIFORM RESOURCE LOCATOR (URL) TRANSFORMATION AND REDIRECTION WITH ACCESS CONTROL

(71) Applicant: SYMANTEC CORPORATION, Mountain View, CA (US)

(72) Inventors: Johann Roturier, Maynooth (IE); David Luz Silva, Dublin (IE); Daniel Kats, Culver City, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 154 days.

(21) Appl. No.: 16/230,738

(22) Filed: Dec. 21, 2018

(51) Int. Cl.
*H04L 9/00* (2006.01)
*H04L 29/06* (2006.01)
*G06F 16/955* (2019.01)

(52) U.S. Cl.
CPC ...... *H04L 63/0876* (2013.01); *G06F 16/9566* (2019.01); *H04L 63/102* (2013.01); *H04L 63/20* (2013.01)

(58) Field of Classification Search
CPC .................................................. H04L 63/0876
See application file for complete search history.

(56) References Cited

U.S. PATENT DOCUMENTS

| | | | |
|---|---|---|---|
| 6,081,900 A * | 6/2000 | Subramaniam | G06Q 20/382 707/999.01 |
| 2012/0209990 A1* | 8/2012 | Honore | H04L 12/1496 709/224 |
| 2015/0117624 A1* | 4/2015 | Rosenshine | H04M 7/003 379/142.04 |
| 2015/0188979 A1* | 7/2015 | Almeras | H04L 67/20 709/217 |
| 2018/0352430 A1* | 12/2018 | Mansour | H04L 63/104 |
| 2020/0067861 A1* | 2/2020 | Leddy | G06Q 30/0185 |

OTHER PUBLICATIONS

Duffy, Jill; "zapier—The 8 Best Alternatives to Google URL Shortner—URL shortening service goo.gl is being discontinued. Here are the best URL shortener alternatives"; webpage; Oct. 3, 2018; located at: https://zapier.com/blog/best-url-shorteners/; accessed on Dec. 21, 2018.

Onelogin, Inc.; "Secure access to Your Own URL Shortener with OneLogin"; webpage; 2018; located at: https://www.onelogin.com/connector/yourls; accessed on Dec. 21, 2018.

(Continued)

*Primary Examiner* — Josnel Jeudy
(74) *Attorney, Agent, or Firm* — Maschoff Brennan

(57) ABSTRACT

Uniform Resource Locator (URL) transformation and redirection with access control. A method may include registering for an account with a secure redirection application; requesting, from the secure redirection application, a unique site identifier for an online entity; receiving, from the secure redirection application, the unique site identifier; submitting user data and the received unique site identifier to the online entity; receiving, from the online entity, a unique URL generated by the secure redirection application, in response to submitting the user data and the received unique site identifier to the online entity; and actuating the unique URL to be directed to the online entity.

20 Claims, 4 Drawing Sheets

(56) References Cited

OTHER PUBLICATIONS

Securelink; "Secure third-party remote access is different"; webpage; 2018; located at: https://www.securelink.com/; accessed on Dec. 21, 2018.

Davis, Josh; "Two Factor Auth (2FA)—List of websites and whether or not they support 2FA"; webpage; located at: https://twofactorauth.org/ ; accessed on Dec. 21, 2018.

* cited by examiner

UNIFORM RESOURCE LOCATOR (URL) TRANSFORMATION AND REDIRECTION WITH ACCESS CONTROL

BACKGROUND

Obtaining products and services today often requires a user to interact with an online service and enter private and secure information into an online interface. For example, a user may use an online service for booking a flight, scheduling a medical appointment, reviewing medical records, ordering food, filing taxes, editing documents, and the like. In many cases, there is no alternative to using online services, or if there is an alternative, use of the online service may be preferred, and there is still no alternative to providing personal information.

The online services may attempt to provide secure online experiences, but the security used may be based on potentially vulnerable web applications that may use the personal user data when generating documents (e.g., hypertext transfer markup language (HTML) documents, portable document format (PDF) documents, text documents) and/or when transmitting user data to third-party services. In some cases, the online services may rely on two-party authentication methods, however, private user information provided in previous submissions may still be exposed.

In another example, some online services may rely on supposedly secret URLs ("links") to share information between a primary user and another user. The secret links may be intercepted in transit unbeknownst to the primary user by way of, for example, an email-based link-following security service mistaking a shared link for a phishing attack, web preview functionality, etc. Further still, the secret links may be bookmarked and/or re-shared by recipient users without the primary user being informed. Thus, these existing solutions do not fully address the potential security issues of a user providing private information to an online service.

SUMMARY

In one embodiment, a computer-implemented method for URL transformation and redirection with access control is described, at least a portion of the method being performed by a client device, the method including: registering for an account with a secure redirection application; requesting, from the secure redirection application, a unique site identifier for an online entity; receiving, from the secure redirection application, the unique site identifier; submitting user data and the received unique site identifier to the online entity; receiving, from the online entity, a unique URL generated by the secure redirection application, in response to submitting the user data and the received unique site identifier to the online entity; and actuating the unique URL to be directed to the online entity.

In one embodiment, before being redirected to the online entity, the method may include providing authentication information to the secure redirection application based on receiving the unique URL.

In one embodiment, registering for the account may further include establishing a security access policy for an entity.

In one embodiment, establishing the security access policy may further include identifying data subprocessors associated with the online entity as authorized URL requestors on behalf of the client device.

In one embodiment, receiving the unique URL may further include receiving the unique URL that is not part of an identifiable sequence of URLs associated with the online entity and/or, receiving the unique URL that does not contain identifiable user data in the URL.

In one embodiment, submitting user data may further include submitting a name, address, telephone phone number, Social Security Number, financial data, preferences, medical data, or a combination thereof.

In one embodiment, the method may further include after registering for the account, establishing a two-factor authentication login. In one embodiment, the method may further include requesting, from the secure redirection application, a second unique site identifier for a second online entity.

In one embodiment, a computer-implemented method for URL transformation and redirection with access control is described, at least a portion of the method being performed by computer device, the method including: receiving a request from a client device to register for a secure redirection application; establishing an account for the secure redirection application for the client device based on the received request; receiving, from the client device, a request for a unique site identifier for an online entity; generating the unique site identifier for the online entity based on receiving the request for the unique site identifier; transmitting the unique site identifier to the client device; receiving, from the online entity, a request for a unique URL for use by the client device to be securely redirected to the online entity; generating, in response to receiving the request for the unique URL, the unique URL; transmitting the unique URL to the online entity based on the request for the unique URL; and redirecting the client device to the online entity based on the client device actuating the unique URL.

In one embodiment, the method may further include, prior to directing the client device to the online entity, authenticating a user associated with the account for the secure redirection application.

In one embodiment, the method may further include, receiving, from the client device, an access policy for the online entity, and applying the access policy to the unique URL.

In one embodiment, receiving the request for the unique URL may further include receiving an original URL generated by the online entity and the unique site identifier.

In one embodiment, the method may further include mapping the original URL to the unique URL, and recording data associated with attempts to access the unique URL, such as recording who, when, how, and where such attempts were made.

In one embodiment, a computer device may include a processor, a memory in electronic communication with the processor, and instructions stored in the memory, with the instructions being executable by the processor to perform a method for URL redirection with access control.

In one embodiment, one or more non-transitory computer-readable media may include one or more computer-readable instructions that, when executed by one or more computing devices, cause the one or more computing devices to perform the method for URL redirection with access control.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
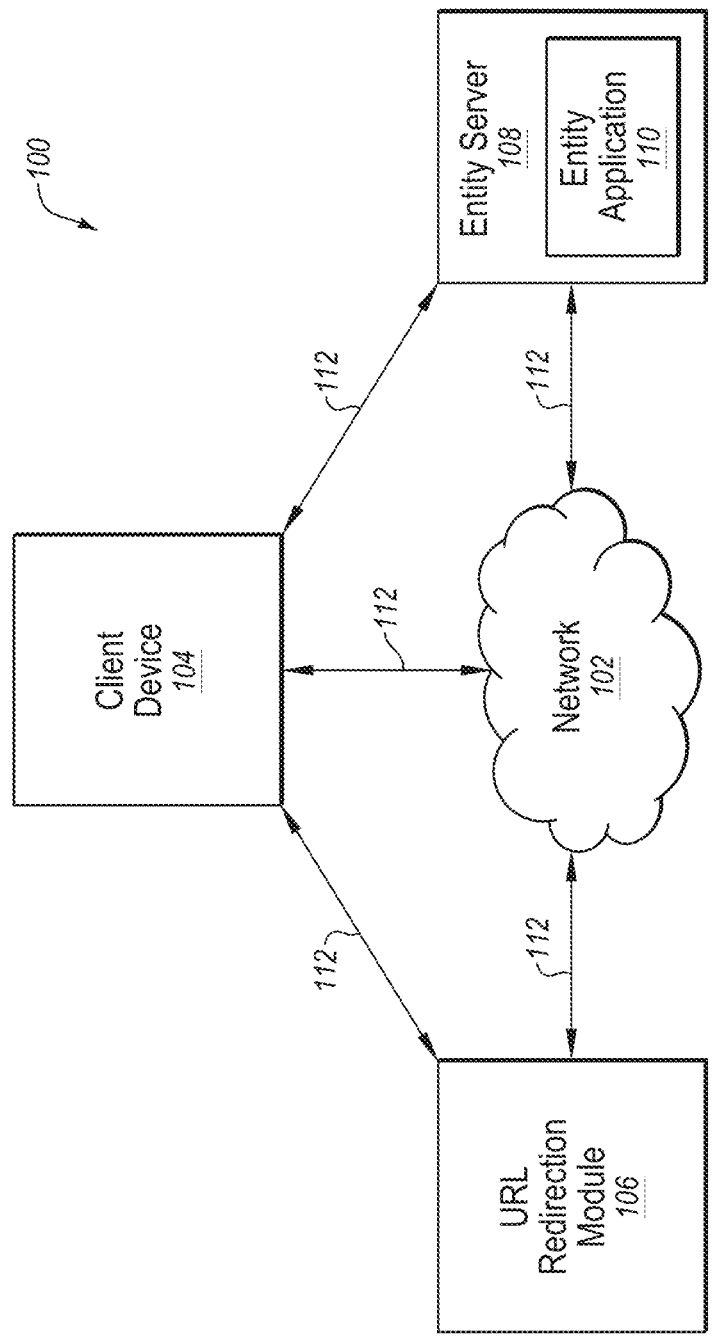
FIG. 1 illustrates an example system configured for URL transformation and redirection with access control.

In order to use online services, a user may be required to submit private user information to online service entities ("entities"). For example, a user may order products or services online, schedule appointments, provide sensitive medical or financial information, order food, order transportation, and the like. The entities providing such services to a user may use vulnerable web applications that do not fully protect the user's information. For example, the entities may use obscure domain names with low reputation, may have weak password requirements, may not store the user data in a back end database with sufficient security, may use single-factor authentication (as opposed to two-factor authentication), and/or may use personalized links using Insecure Direct Object References (IDOR) sent in emails, short message service (SMS) messaging or exposed in hypertext transfer protocol (HTTP) referrer values. Two-factor and multi-factor authentication methods may still lack visibility into access of the links at the user level, and do not prevent personalized, vulnerable URLs from being exposed. Third-party remote access services such as SecureLink provide infrastructure-based solutions, as opposed to link-based solutions. Another current solution may include URL shorteners, such as bitly.com or links with expiration dates; URL shorteners, however, are user-driven instead of service-driven, provide different types of access visibility (e.g., readers, customers), and do not provide authentication, and links with expiration dates do not address in-transit interception threats or accidental forwarding. In some examples, entities may be secured using HTTPS protocols to encrypt traffic to and from a website; however, a user may not feel sufficiently protected by these existing example protocols.

The entity may obtain the user's information, and then the web application associated with the entity may create a generalized link that enables the user to access the documents that contain the private user information. Links which are created and associate the user's information (e.g., personalized links) may have a predictable structure and may be prey to, for example, brute-force login and/or enumeration attempts. For example, the generated link may contain a sequential user identification number, and a malicious user may determine a pattern and use a variation of the generated URL to access links.

In another embodiment, when personalized links are shared legitimately, prying eyes may be tempted to follow the links to obtain private information by way of, for example, email analytics, email security, etc. In an example embodiment, a webmail client may have technology to preview the subject matter of links contained in an email. Previewing the subject matter of links in this way poses a potential security risk due to the possibility that the link is associated with private user information. Furthermore, the link following system may cache at least some of the private user information on a server (e.g., the webmail server, the server associated with the sent link). The webmail entity may have security technology in place which may be attempting to detect, for example, phishing attacks. However, the security technology may not be sufficient to eliminate all or most of the security risks and may still leave some traces of the user's private information behind.

In another embodiment, links containing or associated with private user information may be shared either purposefully or inadvertently. For example, a user may share a link containing his regular Starbucks order on a social media platform such as Instagram or Twitter. The link may be purposefully shared with private followers. Subsequently, however, any of the private followers may forward the link to another party, which may not have been the intended audience of the original user. Links may also be bookmarked and accessed by others. Sharing links and bookmarking may result in security risks that expose the user's private information to unintended parties or in unintended ways. Thus, users may thus desire a solution (1) to control how links may be accessed and (2) visibility into link access attempts by other parties.

As described herein, a solution is provided in which a user, when being asked for private information by a new entity, may specify a secure link identification (ID) which has been previously established using a secure redirection application. In one embodiment, the secure link ID will enable the entity, which may be an online service, to generate a personalized, opaque link which may be securely transmitted or otherwise used, and which may enable redirection from the opaque link to the original link for an authorized user. Secure transmission may be by way of, for example, e-mail, SMS, referrer values, etc. In one embodiment, the opaque URL may be an indirect object reference, as opposed to a direct reference identification or a sequential identification number.

The secure redirection application may provide the user with trusted authentication for URL access by way of secure redirection and the user may gain visibility into access attempts of the opaque link by way of recording access attempts, including by whom, when, how, where, etc. The secure redirection application may rely on the usage of link redirects with access controls, whereby the user may inform an entity that whenever the entity links to a webpage containing user-submitted information, the entity should use the specific user-controlled secure redirection application.

In one embodiment, the user may specify an access policy (e.g., deny all access, but authorize specific endpoints). In an additional or alternative embodiment, the entity's data sub-processors list may be leveraged during policy generation. Further, the security application may be service-agnostic; the user may monitor access attempts of the user's opaque link regardless of the entity's security model.

Turning to the figures, FIG. 1 illustrates an example system 100 configured for URL redirection with access control. The system 100 may include a network 102, a client device 104, a URL redirection module 106 (herein after "redirection module"), an entity server 108, and an entity application 110. In some embodiments, redirection module 106 may execute on a standalone device that communicates with the client device 104 and/or the entity server 108. In an alternative or additional embodiment, the redirection module 106 may be part of client device 104 and/or entity server 108. Entity application 110 may be a software application executing on a computer device associated with a domain and/or a web service, such as on entity server 108.

In some embodiments, the network 102 may be configured to communicatively couple the client device 104 and the entity server 108, and in some embodiments, the redirection module 106. In some embodiments, the network 102 may be any wired or wireless network, or combination of multiple networks, configured to send and receive communications between systems and devices by way of example communication links 112. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
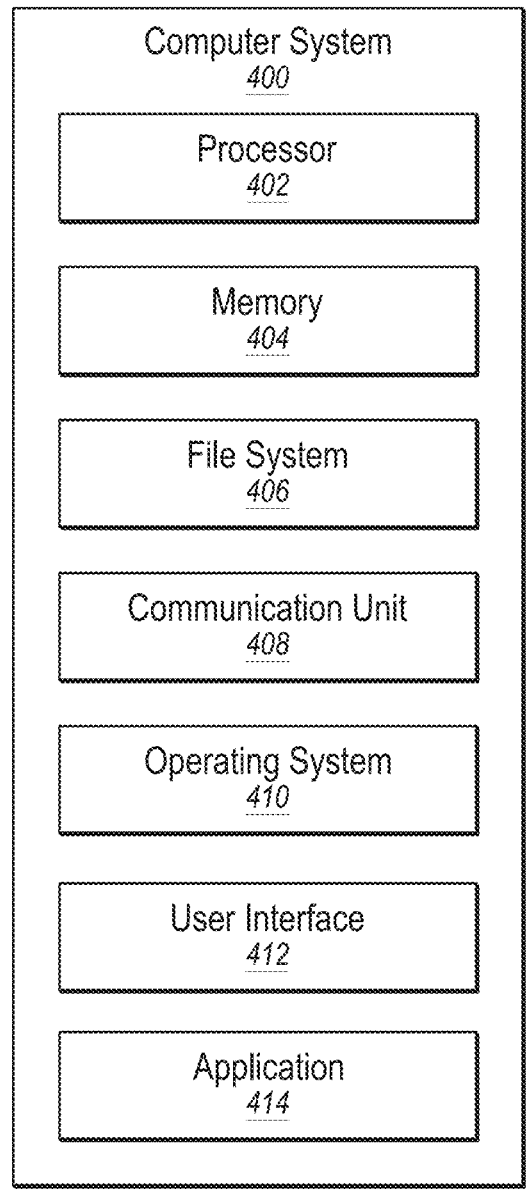
FIG. 4 illustrates an example computer system that may be employed in URL transformation and redirection with access control.

In some embodiments, the client device 104 may be a computer system capable of communicating over the network 102 and capable of, at least, communicating with a URL transformation and redirection service, examples of which are disclosed herein in connection with the computer system 400 of FIG. 4. In some embodiments, the client device 104 may be a computer device, such as a smartphone, desktop computer, laptop computer, control system, tablet, computer wearable device, etc.

In some embodiments, the entity server 108 may be any computer system capable of communicating over the network 102 with client device 104. In some embodiments, the entity server 108 may communicate with the client device 104 through communications with redirection module 106. In some embodiments, an entity application 110 may be associated with entity server 108, where entity application 110 may enable user interaction with an online service associated with the entity associated with the entity server 108. Examples of client device 104 and/or entity server 108 are disclosed herein in connection with the computer system 400 of FIG. 4.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Further, it is understood that the communication links 112 between the components illustrated in FIG. 1 (illustrated as left-right arrows) may be part of the network 102 or another network.

Figure 2:
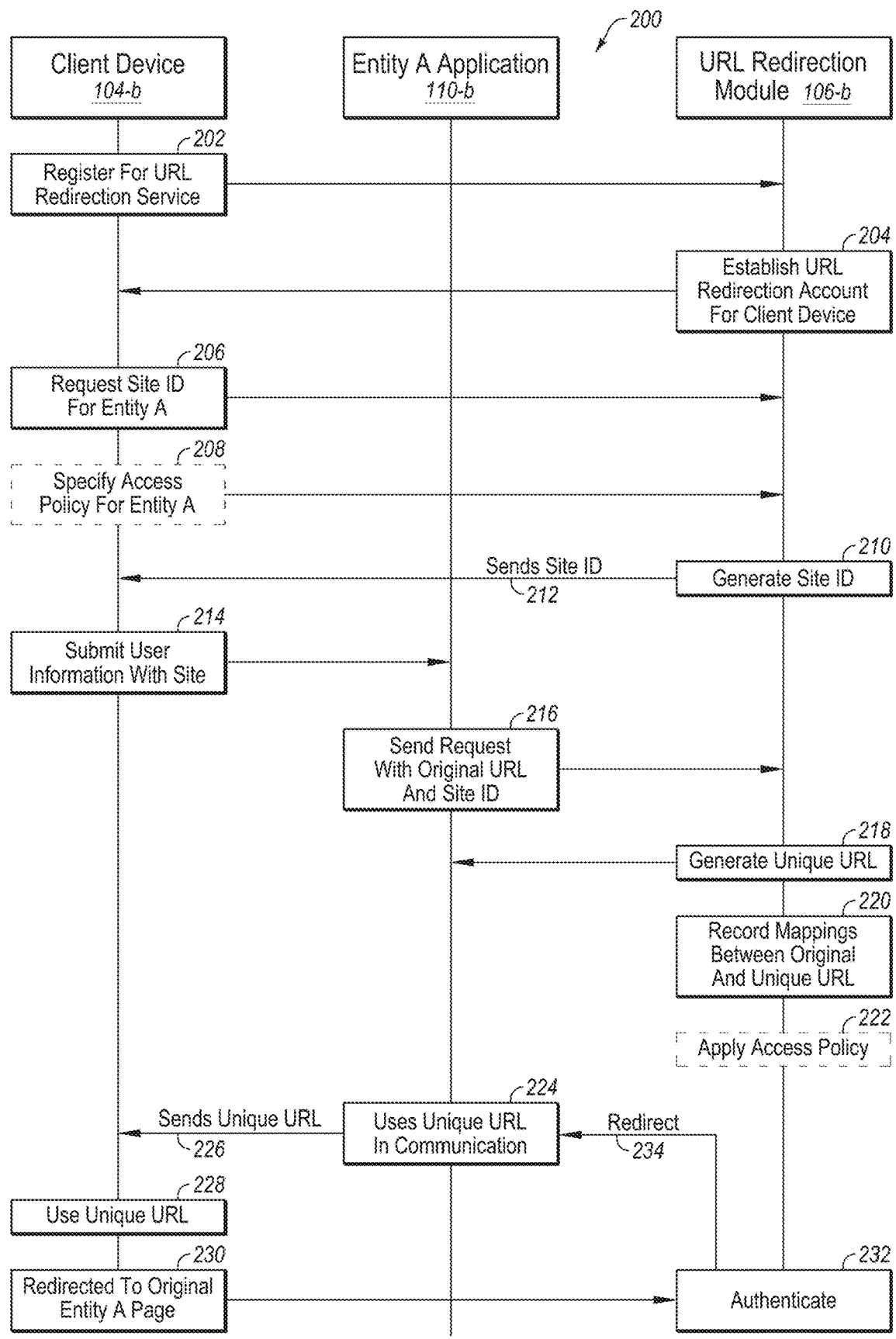
FIG. 2 illustrates an example process flow diagram of a method for URL transformation and redirection with access control.

FIG. 2 illustrates an example process flow diagram 200 for URL redirection with access control. The process 200 may be performed, in some embodiments, by a device or system, such as by client device 104, redirection module 106, entity server 108, and/or entity application 110, operating independently or on one of the other described devices. In these and other embodiments, the process 200 may be performed by one or more processors based on one or more computer-readable instructions stored on one or more non-transitory computer-readable media. The process 200 will now be described in connection with FIG. 1.

In an example embodiment, process flow diagram 200 shows actions by and interactions between client device 104-b, a software application associated with Entity A (where entity A may be an online service), and with a URL redirection module 106-b ("redirection module"). Client device 104-b, entity A application 110-b, and redirection module 106-b may be similar to or the same as client device 104, entity application 110, and redirection module 106 described with reference to FIG. 1, respectively.

In one embodiment, redirection module 106-b may be a secure redirection application that enables a user to set up an account for generating security identifiers for specific entities. In an example embodiment shown in FIG. 2, the user associated with the client device 104-b may want to share and receive information from entity A, which may be a restaurant that delivers food. In one embodiment, entity A may be configured to enable the collection of redirection links generated by redirection module 106-b.

At action 202, the user may interact with the client device 104-b to register for the secure redirection application via redirection module 106-b. At action 204, the redirection module 106-b establishes a redirection account for the user associated with client device 104-b. Once the user registers for the redirection service, the secure redirection application may be used again without repeating action 202.

After registering for the secure redirection application, client device 104-b is used to interact with an online service/entity. For example, the user may use his or her smartphone to order delivery food from a restaurant, entity A. Ordering delivery food from Entity A may involve multiple parties, for example, the restaurant, a third-party delivery service (e.g., GrubHub, Uber Eats), and at least one financial institution. Thus, there is a potential security risk when the user shares private information with entity A. At action 206, using the redirection service application executing on client device 104-b, the user may request a unique site identifier (ID) from the redirection module 106-b for entity A. In addition, at action 208, the user may specific an access policy for entity A which may be transmitted to the redirection module 106-b. In an example, the access policy may include entity A's data subprocessors as authorized URL requestors.

At action 210, the redirection module 106-b may generate the unique site ID for Entity A. At action 212, the redirection module 106-b may send the generated unique site ID to the client device 104-b.

The user, now ordering the food to be delivered from Entity A, provides Entity A with the food order and user information including, but not limited to, contact information (e.g., name, address, telephone number) and financial information (e.g., debit or credit card information). At action 214, in addition to the order information and the user information, the user also submits the unique site ID generated by the redirection module 106-b to entity A application 110-b associated with entity A.

Entity A application 110-b generates an original link for tracking the user's order. At action 216, entity A application 110-b sends a request to the redirection module 106-b for the redirection module 106-b to generate a unique, opaque, and personalized link for the food delivery, the request including both the original link and the generated site ID.

At action 218, the redirection module 106-b, as requested by the Entity A application 110-b, generates the opaque link given the original link and the site ID. For example, an original may be https://feedmenow.com/booking/receit/123456, whereas the generated opaque link may be: https://ze1.da/3f455a62-e283-11e8-886f-54ee75ade187-7b780c82-e283-11e8-bc6a-54ee75ade187.

At action 220, the redirection module 106-b may also record a series of mappings between the original links and the unique links. At action 222, the redirection module 106-b may apply the access policy established by the client device 104-b at action 208.

Entity A may wish to send a communication (e.g., email, text message) to the client device 104-b, or another party, which may contain, for example, a receipt, a status of the order, and/or tracking information. The information entity A wishes to communicate, however, may contain private user information which may be subject to security issues in transit. Thus, instead of sending a direct link to the third-party delivery service's link, for example, at action 226, entity A may send the communication with the opaque link generated by the redirection module 106-*b*.

At action 228, the client device 104-*b* receives the opaque from entity A, and the user may check the secure redirection application account to see which, if any, parties have attempted to access the link in transit.

At action 230, the client device 104-*b* may access the opaque link and is redirected to the original entity A webpage. In one embodiment, the user may be requested to provide redirection authentication (action 232), before redirection, and thus any link interception and/or access attempt may be tracked by the URL redirection module 106-*b*. For example, if an unauthorized or unintended party intercepts the communication and attempts to follow the opaque link, the unauthorized or unintended party will be redirected to the redirection application and be prompted for identification. In one embodiment, redirection may be reliant on the access policy. For example, the user may have set up access policy rules to automatically block or accept specific requests (e.g., for specific subproccessors, endpoints, etc.).

In an additional or alternative embodiment, the user may access the opaque URL on a device different from the client device 104. For example, a user may be sent the opaque URL in an email access initially at client device 104, but may also click on and follow the opaque link by opening the same email on a laptop or desktop computer or a tablet. Similarly, a user may be sent an SMS message with the opaque link on client device 104, but may access the SMS on a web-based messaging platform on a laptop, desktop, or tablet.

Although the example case of a user ordering food is described, any scenario in which a user provides personal information to an online service may be contemplated. For example, the URL direction maybe used in risk-heavy scenarios, such as sending password reset links.

Figure 3:
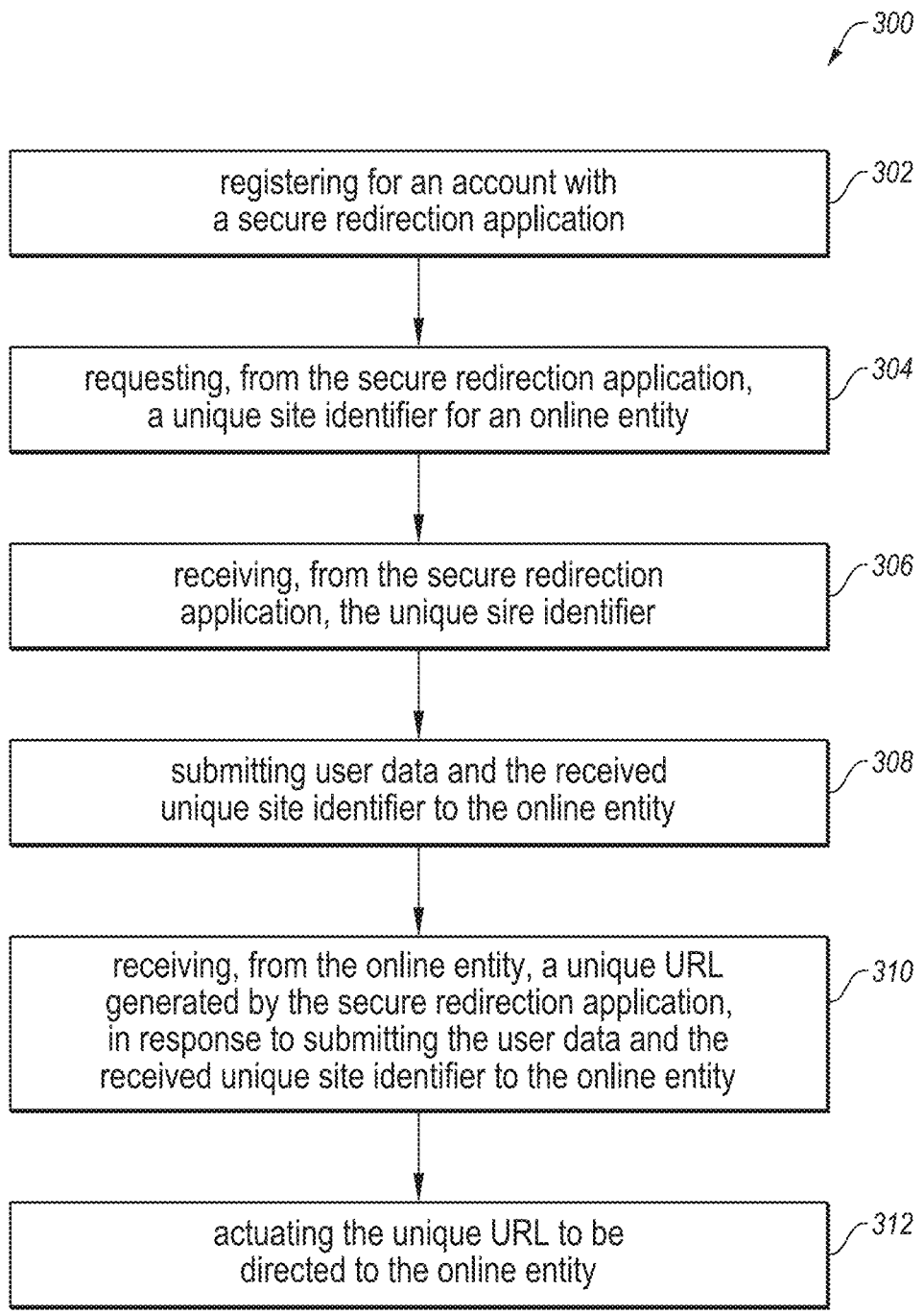
FIG. 3 illustrates a flowchart of an example method for URL transformation and redirection with access control.

FIG. 3 illustrates an example method 300 for URL redirection with access control. The method 300 may be performed, in some embodiments, by a device or system, such as by client device 104, redirection module 106, entity server 108, and/or entity application 110, operating independently or on one of the other described devices. In these and other embodiments, the method 300 may be performed by one or more processors based on one or more computer-readable instructions stored on one or more non-transitory computer-readable media. The method 300 will now be described in connection with FIGS. 1 and 2.

Method 300 may include, at action 302, registering for an account with a secure redirection application. For example, a user may interact with a graphical user interface provided by the secure redirection application executing on client device 104 to register for an account. Registration may include, but is not limited to, user identification and authentication information, and in some embodiments, access policy preferences.

Method 300 may include, at action 304, requesting, from the secure redirection application, a unique site identifier for an online entity. For example, the user may wish to interact with an online entity which further includes providing the online service/entity with private user data. Thus, the client device 104 may transmit a request to the secure redirection application via the URL redirection module 106 to request a unique site identifier associated with the user and the online entity and based at least in part on the user's account with the secure redirection application.

Method 300 may include, at action 306, receiving, from the secure redirection application, the unique site identifier. For example, in response to the request, the URL redirection module 106 generates a unique site identifier for the online service and transmits the unique site ID to the client device 104.

Method 300 may include, at action 308, submitting user data and the received unique site identifier to the online entity. For example, the user submits user information to the online service using client device 104-*b*. The user information may contain private information the user wishes to keep secure. In addition to the user information, the user also provides the unique site identifier generated by the URL redirection module 106.

Method 300 may include, at action 310, receiving, from the online entity, a unique URL generated by the secure redirection application, in response to submitting the user data and the received unique site identifier to the online entity. For example, the client device may receive, from the online entity, an opaque URL, which provides secure access to the user's private information by way of a redirection to the online entity via the URL redirection module 106.

Method 300 may include, at action 312, actuating the unique URL to be directed to the online entity. For example, the user may click on the link received in a communication from the online entity server 108 (e.g, by way of entity application 110), which enables a secure redirection to the online entity.

Although the actions of the method 300 are illustrated in FIG. 3 as discrete actions, various actions may be divided into additional actions, combined into fewer actions, reordered, expanded, or eliminated, depending on the desired implementation.

The system and methods described may provide a plurality of benefits and technological improvements. In one embodiment, the generation of and use of the opaque URL prevents phishing attacks, such as by parties redirecting a user to an unintended page using a masked URL. In addition, a user inadvertently receiving a generated opaque ID may need to be properly authenticated in order to access and review the associated content, thus, reducing or eliminating access to information by unintended parties.

In one embodiment, the General Data Protection Regulation (GDPR) may require entities to be clear about who is handling user data, and thus the solution described herein provides a transparency solution to data handling. The user is provided with information on who has attempted to access the opaque URL, including when, how, where, etc.

Furthermore, the functioning of the computer system itself may be improved by providing a useful mechanism for protecting user data, preventing and mitigating malware issues, and observing trends on collected data using privacy-preserving analytics to prevent future malware.

FIG. 4 illustrates an example computer system 400 that may be employed in URL redirection with access controls. In some embodiments, the computer system 400 may be part of any of the systems or devices described in this disclosure. For example, the computer system 400 may be part of the client device 104, entity service 108, URL redirection module 106, and/or entity application 110 of FIG. 1 and/or of client device 104-*b*, URL redirection module 106-*b*, and/or entity A application 110-*b* of FIG. 2.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the process flow 200 and method 300 of FIGS. 2 and 3, respectively.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the process flow 200 or method 300 of FIGS. 2 and 3, respectively. These computer-executable instructions may be included, for example, in the operating system 410, in one or more applications, URL redirection modules 106, 106-b, and/or entity application 110, and/or entity A application 110-b, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, a 402.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the process flow 200 and the method 300 of FIGS. 2 and 3. In some embodiments, the module 414 may be part of the operating system 410 or may be part of an application of the computer system 400, or may be some combination thereof. In some embodiments, the module 414 may function as URL redirection modules 106 and 106-b of FIGS. 1 and 2, respectively.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for uniform resource locator (URL) redirection with access control, at least a portion of the method being performed by a client device comprising one or more processors, the method comprising:
   registering for an account with a secure redirection application;
   requesting, by the client device and from the secure redirection application, a unique site identifier for an online entity;
   receiving, at the client device and from the secure redirection application, the unique site identifier;
   submitting, from the client device, user data and the received unique site identifier to the online entity;
   receiving, from the online entity, a unique URL generated by the secure redirection application, in response to submitting the user data and the received unique site identifier to the online entity; and
   actuating the unique URL to be directed to the online entity.

2. The method of claim 1, further comprising:
   before being directed to the online entity, providing authentication information to the secure redirection application based on receiving the unique URL.

3. The method of claim 1, wherein registering for the account further comprises:
   establishing a security access policy for an entity.

4. The method of claim 3, wherein establishing the security access policy further comprises:
   identifying data subprocessors associated with the online entity as authorized URL requestors on behalf of the client device.

5. The method of claim 1, wherein receiving the unique URL further comprises:
   receiving the unique URL that is not part of an identifiable sequence of URLs associated with the online entity.

6. The method of claim 1, wherein receiving the unique URL further comprises:
   receiving the unique URL that does not contain identifiable user data in the URL.

7. The method of claim 1, wherein submitting the user data further comprises:
   submitting a name, address, telephone phone number, Social Security Number, financial data, preferences, medical data, or a combination thereof.

8. The method of claim 1, further comprising:
   after registering for the account, establishing a two-factor authentication login.

9. The method of claim 1, further comprising:
   requesting, from the secure redirection application, a second unique site identifier for a second online entity.

10. A computer-implemented method for uniform resource locator (URL) redirection with access control, at least a portion of the method being performed by a computing device comprising one or more processors, the method comprising:
> receiving a request from a client device to register for a secure redirection application;
> establishing an account for the secure redirection application for the client device based on the received request;
> receiving, from the client device, a request for a unique site identifier for an online entity;
> generating the unique site identifier for the online entity based on receiving the request for the unique site identifier;
> transmitting the unique site identifier to the client device;
> receiving, from the online entity, a request for a unique URL for use by the client device to be securely redirect to the online entity;
> generating, in response to receiving the request for the unique URL, the unique URL;
> transmitting the unique URL to the online entity based on the request for the unique URL; and
> actuating the unique URL to be directed to the online entity.

11. The method of claim 10, further comprising:
> prior to directing the client device to the online entity, authenticating a user associated with the account for the secure redirection application.

12. The method of claim 10, further comprising:
> receiving, from the client device, an access policy for the online entity.

13. The method of claim 12, further comprising:
> applying the access policy to the unique URL.

14. The method of claim 11, wherein receiving the request for the unique URL further comprises:
> receiving an original URL generated by the online entity and the unique site identifier.

15. The method of claim 14, further comprising:
> mapping the original URL to the unique URL.

16. The method of claim 14, further comprising:
> recording data associated with attempts to access the unique URL.

17. A client device comprising:
> a processor;
> a memory in electronic communication with the processor; and
> instructions stored in the memory, the instructions being executable by the processor to:
>> register for an account with a secure redirection application;
>> request, by the client device and from the secure redirection application, a unique site identifier for an online entity;
>> receive, at the client device and from the secure redirection application, the unique site identifier;
>> submit, from the client device, user data and the received unique site identifier to the online entity;
>> receive, from the online entity, a unique URL generated by the secure redirection application, in response to submitting the user data and the received unique site identifier to the online entity; and
>> actuate the unique URL to be directed to the online entity.

18. The client device of claim 17, wherein the instructions are further operable to cause the processor to:
> before being directed to the online entity, provide authentication information to the secure redirection application based on receiving the unique URL.

19. The client device of claim 17, wherein when the instructions register for the account the processor is further operable to:
> establish a security access policy for an entity.

20. The client device of claim 17, wherein when the instructions receive the unique site identifier the processor is further operable to:
> receive the unique URL that is not part of an identifiable sequence of URLs associated with the online entity, receiving the unique URL that does not contain identifiable user data in the unique URL, or a combination thereof.

* * * * *